(12) United States Patent
Kim et al.

(10) Patent No.: US 11,550,184 B2
(45) Date of Patent: Jan. 10, 2023

(54) POLARIZING PLATE LAMINATE AND DISPLAY DEVICE COMPRISING SAME

(71) Applicant: LG CHEM, LTD., Seoul (KR)

(72) Inventors: Youngjin Kim, Daejeon (KR); Kyun Do Park, Daejeon (KR); Do Hyun Kim, Daejeon (KR); Dae Hee Lee, Daejeon (KR); Sunghak Bae, Daejeon (KR); Han Min Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/609,332

(22) PCT Filed: Aug. 20, 2020

(86) PCT No.: PCT/KR2020/011070
§ 371 (c)(1),
(2) Date: Nov. 5, 2021

(87) PCT Pub. No.: WO2021/040312
PCT Pub. Date: Mar. 4, 2021

(65) Prior Publication Data
US 2022/0163844 A1    May 26, 2022

(30) Foreign Application Priority Data

Aug. 26, 2019 (KR) .......... 10-2019-0104419
Aug. 26, 2019 (KR) .......... 10-2019-0104423

(51) Int. Cl.
*G02F 1/1335* (2006.01)

(52) U.S. Cl.
CPC .. *G02F 1/133528* (2013.01); *G02F 1/133562* (2021.01); *G02F 1/133567* (2021.01)

(58) Field of Classification Search
None
See application file for complete search history.

(56) References Cited

U.S. PATENT DOCUMENTS

| | | |
|---|---|---|
| 2012/0212816 A1 | 8/2012 | Kim et al. |
| 2015/0002010 A1 | 1/2015 | Lee et al. |
| 2016/0252665 A1 | 9/2016 | Lee et al. |
| 2018/0039011 A1 | 2/2018 | Hoyle et al. |
| 2018/0045876 A1 | 2/2018 | Lee et al. |
| 2019/0285938 A1 | 9/2019 | Oh et al. |
| 2019/0310394 A1 | 10/2019 | Miyamoto et al. |

(Continued)

FOREIGN PATENT DOCUMENTS

| | | |
|---|---|---|
| JP | 2011-232367 A | 11/2011 |
| KR | 10-2011-0005458 A | 1/2011 |
| KR | 10-2011-0047154 A | 5/2011 |

(Continued)

OTHER PUBLICATIONS

Translation of KR101802628B1 (Year: 2017).*

*Primary Examiner* — Phu Vu
(74) *Attorney, Agent, or Firm* — Dentons US LLP

(57) ABSTRACT

The polarizing plate laminate according to an exemplary embodiment of the present disclosure includes: a polarizer; an adhesive agent layer or a bonding agent layer provided on the polarizer; a viewing angle compensation film provided on the adhesive agent layer or the bonding agent layer; and a base film provided on the viewing angle compensation film.

14 Claims, 9 Drawing Sheets

(56) References Cited

U.S. PATENT DOCUMENTS

2020/0057333 A1     2/2020   Ju et al.

FOREIGN PATENT DOCUMENTS

| | | |
|---|---|---|
| KR | 10-2014-0087669 A | 7/2014 |
| KR | 10-2015-0002354 A | 1/2015 |
| KR | 10-1659241 B1 | 9/2016 |
| KR | 10-2017-0057087 A | 5/2017 |
| KR | 10-2017-0091453 A | 8/2017 |
| KR | 101802628 B1 * | 11/2017 |
| KR | 10-2018-0055265 A | 5/2018 |
| KR | 10-2018-0096447 A | 8/2018 |
| KR | 10-1963006 B1 | 3/2019 |
| TW | 201643483 A | 12/2016 |
| WO | 2017217526 A1 | 12/2017 |
| WO | 2018226711 A1 | 12/2018 |

* cited by examiner

[Figure 1]

| 10 |
|---|
| 20 |
| 30 |
| 40 |

[Figure 2]

| 10 |
|---|
| 20 |
| 30 |
| 40 |
| 50 |

[Figure 3]
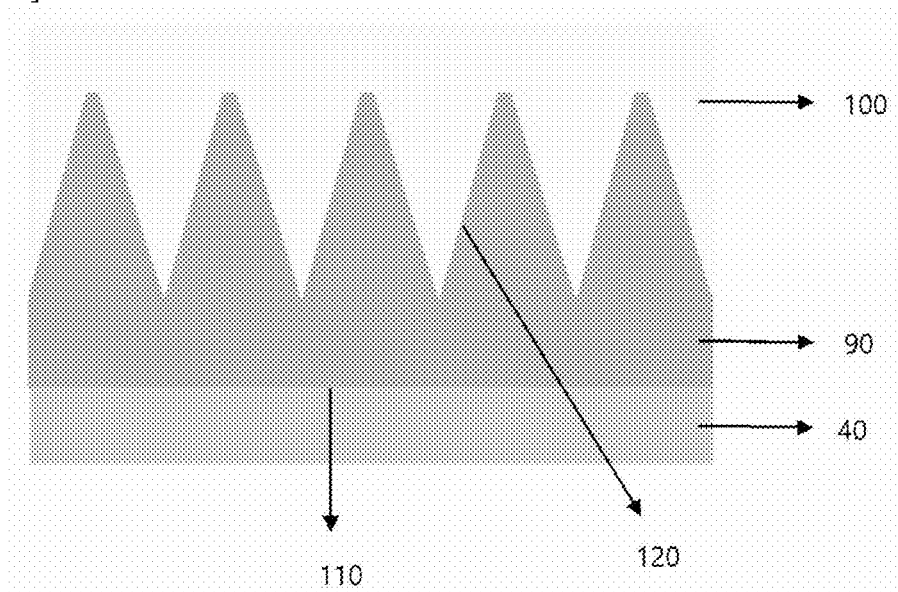
[Figure 4]
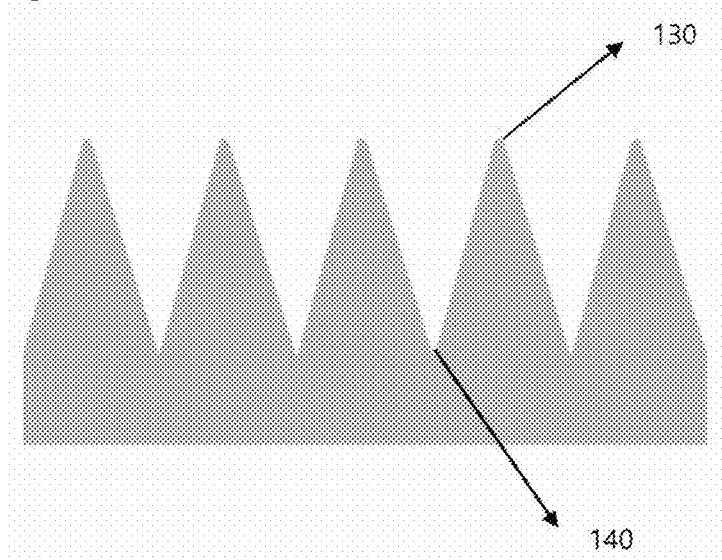

[Figure 5]
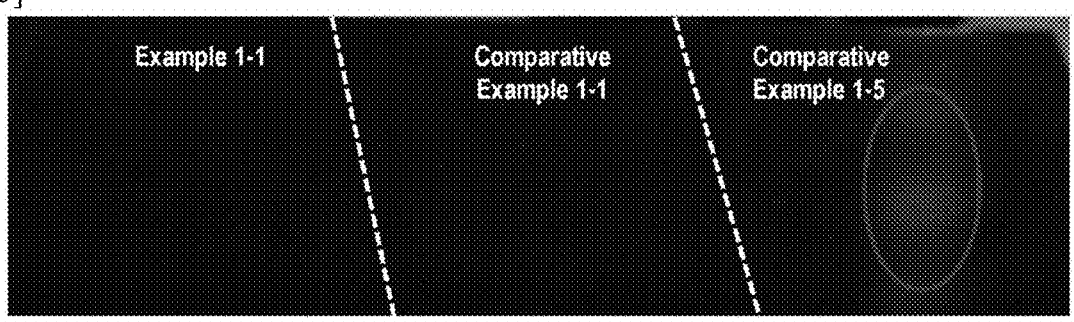

[Figure 6]
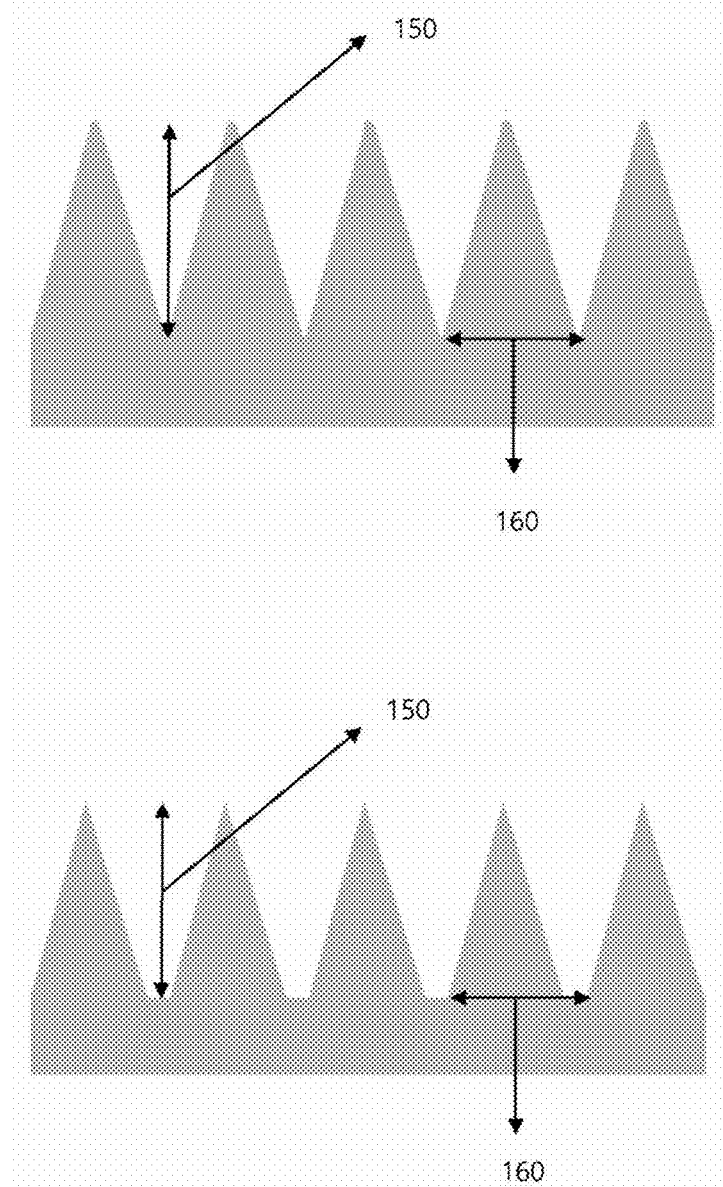

[Figure 7]
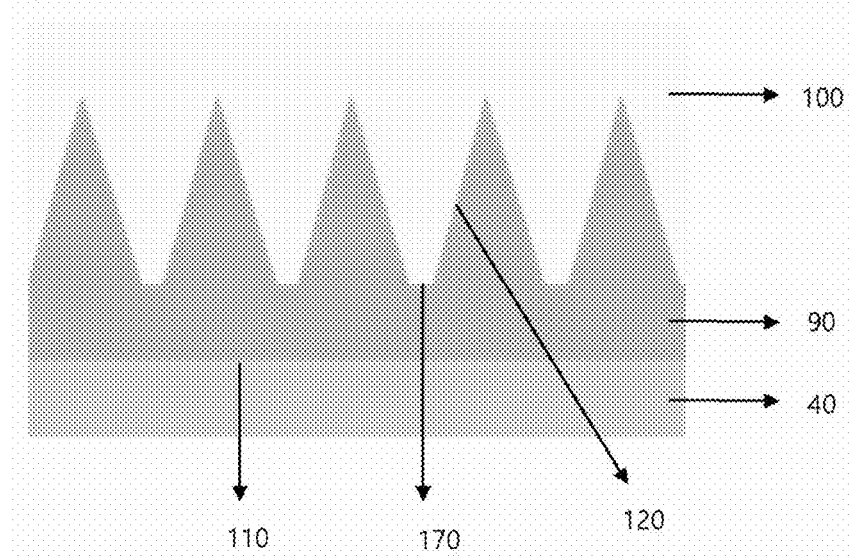
[Figure 8]
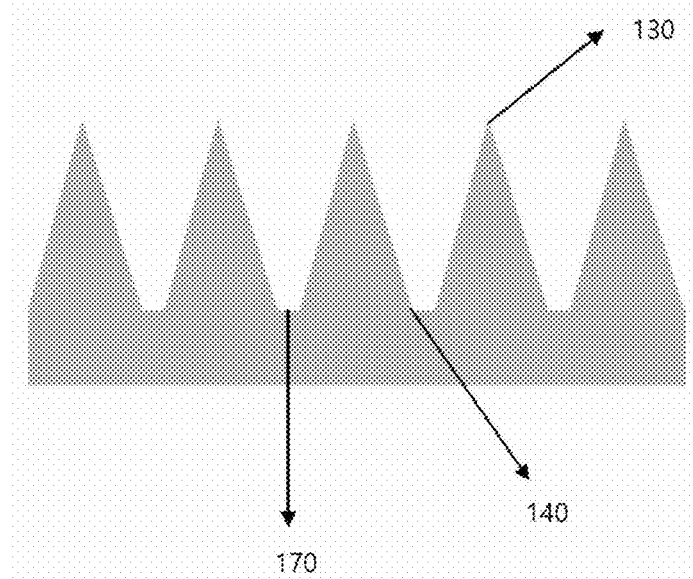

[Figure 9]

| |
|---|
| 50 |
| 60 |
| 20 |
| 10 |
| 20 |
| 60 |
| 80 |
| 20 |
| 70 |
| 20 |
| 60 |
| 10 |
| 20 |
| 60 |
| 20 |
| 30 |
| 40 |
| 50 |

[Figure 10]

| |
|---|
| 50 |
| 60 |
| 20 |
| 10 |
| 20 |
| 60 |
| 20 |
| 70 |
| 20 |
| 60 |
| 10 |
| 20 |
| 60 |
| 20 |
| 30 |
| 40 |
| 50 |

[Figure 11]

| |
|---|
| 50 |
| 60 |
| 20 |
| 10 |
| 20 |
| 60 |
| 80 |
| 20 |
| 70 |
| 20 |
| 60 |
| 10 |
| 20 |
| 30 |
| 40 |
| 50 |

[Figure 12]

| |
|---|
| 50 |
| 60 |
| 20 |
| 10 |
| 20 |
| 60 |
| 20 |
| 70 |
| 20 |
| 60 |
| 10 |
| 20 |
| 30 |
| 40 |
| 50 |

POLARIZING PLATE LAMINATE AND DISPLAY DEVICE COMPRISING SAME

CROSS-REFERENCE TO RELATED APPLICATIONS

This application is a National Phase entry pursuant to 35 U.S.C. § 371 of International Application No. PCT/KR2020/011070 filed on Aug. 20, 2020, and claims priority to and the benefits of Korean Patent Application Nos. 10-2019-0104419 and 10-2019-0104423, both filed on Aug. 26, 2019, the entire contents of which are incorporated by reference in their entirety for all purposes as if fully set forth herein.

TECHNICAL FIELD

The present application relates to a polarizing plate laminate and a display device comprising the same.

BACKGROUND ART

A liquid crystal display device is one of the flat panel displays which have been widely used from mobile phones or portable small electronic devices to large electronic devices such as personal computers or televisions, and whose use is gradually expanding.

As the use of display devices has expanded, the places where the display devices are placed and their positions have become diversified, but the flat panel display has a problem in that a clear image cannot be obtained when viewed from another direction rather than the front of the display. In particular, a display for a vehicle has a problem in that a clear image cannot be obtained from the driver's visual field because the position of the display and the line of sight of the driver are not parallel.

Therefore, in order to solve these problems, there is a need for developing a display device capable of improving the viewing angle and the contrast ratio.

DISCLOSURE

Technical Problem

The present application has been made in an effort to provide a polarizing plate laminate and a display device comprising the same.

Technical Solution

An exemplary embodiment of the present application provides a polarizing plate laminate comprising:
a polarizer;
an adhesive agent layer or a bonding agent layer provided on the polarizer;
a viewing angle compensation film provided on the adhesive agent layer or the bonding agent layer; and
a base film provided on the viewing angle compensation film, in which the viewing angle compensation film comprises a pattern layer and a planarization layer and a difference in refractive index between the pattern layer and the planarization layer is 0.02 to 0.4,
the pattern layer comprises: a first surface comprising a flat surface; and a second surface facing the first surface and comprising a plurality of protrusions,
each of the protrusions comprises a first inclined surface and a second inclined surface,
an angle ($\theta_1$) between the first inclined surface or a surface extending from the first inclined surface and the first surface and an angle ($\theta_2$) between the second inclined surface or a surface extending from the second inclined surface and the first surface are the same as each other,
an aspect ratio of each of the protrusions represented by the following Equation 1 is more than 1.5 and less than 3.0, and
the highest point or lowest point of each of the protrusions has a radius of curvature (R) of 1 μm or less.

$$\text{Aspect ratio of protrusion} = \text{Height of protrusion/Pitch of protrusion} \quad \text{[Equation 1]}$$

Another exemplary embodiment of the present application provides a polarizing plate laminate comprising:
a polarizer;
an adhesive layer or a bonding agent layer provided on the polarizer;
a viewing angle compensation film provided on the adhesive agent layer or the bonding agent layer; and
a base film provided on the viewing angle compensation film,
in which the viewing angle compensation film comprises a pattern layer and a planarization layer and a difference in refractive index between the pattern layer and the planarization layer is 0.02 to 0.4,
the pattern layer comprises: a first surface comprising a flat surface; and a second surface facing the first surface and comprising a plurality of protrusions,
each of the protrusions comprises a first inclined surface and a second inclined surface,
an angle ($\theta_1$) formed by the first surface with the first inclined surface or a surface extending from the first inclined surface, and an angle ($\theta_2$) formed by the first surface with the second inclined surface or a surface extending from the second inclined surface have the same angle with each other,
an aspect ratio of each of the protrusions represented by the following Equation 1 is more than 1.5 and less than 3.0, and
a flat surface is provided between the protrusions adjacent to each other.

$$\text{Aspect ratio of protrusions} = \text{Height of protrusions/Pitch of protrusions} \quad \text{[Equation 1]}$$

Further, another exemplary embodiment of the present application provides a display device comprising:
a liquid crystal cell;
a first polarizing plate provided at a viewing side of the liquid crystal cell;
a second polarizing plate provided at a side opposite to the viewing side of the liquid crystal cell; and
a backlight unit provided at a side opposite to a surface of the second polarizing plate facing the liquid crystal cell,
in which the first polarizing plate or the second polarizing plate is the polarizing plate laminate.

Advantageous Effects

The polarizing plate laminate according to an exemplary embodiment of the present application can improve a contrast ratio and can enhance a viewing angle by comprising a viewing angle compensation film comprising protrusions having an aspect ratio of more than 1.5 and less than 3.0 and a radius of curvature (R) of the peak of 1 μm or less.

Further, the polarizing plate laminate according to an exemplary embodiment of the present application can improve a contrast ratio and can enhance a viewing angle by comprising a viewing angle compensation film in which a flat surface is provided between protrusions adjacent to each other, the protrusions having an aspect ratio of more than 1.5 and less than 3.0.

Accordingly, a display device comprising the polarizing plate laminate according to an exemplary embodiment of the present application can obtain a clear image from the driver's visual field when used as a display device for a vehicle because it is possible to improve the contrast ratio and enhance the viewing angle.

DESCRIPTION OF DRAWINGS

FIGS. 1 and 2 are views each schematically illustrating a polarizing plate laminate according to an exemplary embodiment of the present application.

FIG. 3 is a view schematically illustrating a viewing angle compensation film according to an exemplary embodiment of the present application.

FIG. 4 is a view schematically illustrating a pattern layer comprised in a viewing angle compensation film according to an exemplary embodiment of the present application.

FIG. 5 is a view illustrating black states of the display devices of Example 1-1 and Comparative Examples 1-1 and 1-5 as an exemplary embodiment of the present application.

FIG. 6 is a view schematically illustrating the height of a protrusion and the pitch of the protrusion according to an exemplary embodiment of the present application.

FIG. 7 is a view schematically illustrating a viewing angle compensation film according to an exemplary embodiment of the present application.

FIG. 8 is a view schematically illustrating a pattern layer comprised in a viewing angle compensation film according to an exemplary embodiment of the present application.

FIGS. 9 to 12 are views each schematically illustrating a display device according to an exemplary embodiment of the present application.

EXPLANATION OF REFERENCE NUMERALS AND SYMBOLS

10: Polarizer
20: Adhesive agent layer or bonding agent layer
30: Viewing angle compensation film
40: Base film
50: Optical layer
60: Polarizer protection film
70: Liquid crystal cell
80: Liquid crystal (LC)
90: Pattern layer
100: Planarization layer
110: First surface of pattern layer
120: Second surface of pattern layer
130: Highest point of protrusion
140: Lowest point of protrusion
150: Height of protrusion
160: Pitch of protrusion
170: Flat surface between protrusions adjacent to each other

DETAILED DESCRIPTION

Hereinafter, preferred exemplary embodiments of the present application will be described. However, the exemplary embodiments of the present application can be modified into various other forms, and the scope of the present application is not limited to the exemplary embodiments which will be described below. Further, the exemplary embodiments of the present application are provided to explain the present invention in more detail to a person with ordinary skill in the art.

A polarizing plate laminate according to an exemplary embodiment of the present application comprises: a polarizer; an adhesive agent layer or a bonding agent layer provided on the polarizer; a viewing angle compensation film provided on the adhesive agent layer or the bonding agent layer; and a base film provided on the viewing angle compensation film, in which the viewing angle compensation film comprises a pattern layer and a planarization layer and a difference in refractive index between the pattern layer and the planarization layer is 0.02 to 0.4, the pattern layer comprises: a first surface comprising a flat surface; and a second surface facing the first surface and comprising a plurality of protrusions, each of the protrusions comprises a first inclined surface and a second inclined surface, an angle ($\theta_1$) between the first inclined surface or a surface extending from the first inclined surface and the first surface and an angle ($\theta_2$) between the second inclined surface or a surface extending from the second inclined surface and the first surface are the same as each other, an aspect ratio of each of the protrusions represented by the following Equation 1 is more than 1.5 and less than 3.0, and the highest point of each of the protrusions has a radius of curvature (R) of 1 μm or less.

$$\text{Aspect ratio of protrusions} = \text{Height of protrusions}/\text{Pitch of protrusions} \qquad \text{[Equation 1]}$$

Further, a polarizing plate laminate according to another exemplary embodiment of the present application comprises: a polarizer; an adhesive layer or a bonding agent layer provided on the polarizer; a viewing angle compensation film provided on the adhesive agent layer or the bonding agent layer; and a base film provided on the viewing angle compensation film, in which the viewing angle compensation film comprises a pattern layer and a planarization layer and a difference in refractive index between the pattern layer and the planarization layer is 0.02 to 0.4, the pattern layer comprises: a first surface comprising a flat surface; and a second surface facing the first surface and comprising a plurality of protrusions, each of the protrusions comprises a first inclined surface and a second inclined surface, an angle ($\theta_1$) between the first inclined surface or a surface extending from the first inclined surface and the first surface and an angle ($\theta_2$) between the first surface with the second inclined surface or a surface extending from the second inclined surface and the first surface are the same as each other, an aspect ratio of each of the protrusions represented by the following Equation 1 is more than 1.5 and less than 3.0, and a flat surface is provided between the protrusions adjacent to each other.

$$\text{Aspect ratio of protrusions} = \text{Height of protrusions}/\text{Pitch of protrusions} \qquad \text{[Equation 1]}$$

In the present application, the term "viewing side" means a surface or direction arranged so as to face the viewer side when a polarizing plate is mounted to a display device such as a liquid crystal display device. In contrast, the "side opposite to the viewing side" means a side opposite to the viewer, that is, a surface or direction arranged so as to face a backlight unit when a polarizing plate is mounted on a display device such as a liquid crystal display device.

In the present application, the "extension" means to elongate while maintaining the slope of a straight line or a flat surface.

In the present application, the "flat surface" means that the center line average roughness (Ra) is less than 0.1 μm.

In an exemplary embodiment of the present application, the height of the protrusion means the vertical distance between the lowest point of the protrusion and the highest point of the protrusion, and the height of the protrusion can be 5 μm to 100 μm, and can be 10 μm to 30 μm. The case where the pitch of the protrusion is the same and the height of the protrusion is low means that the vertex angle of the protrusion is increased, and in this case, the adjustment of the refraction angle of light is weakened, so that the contrast ratio of the wide viewing angle can be lowered. Therefore, in an exemplary embodiment of the present application, the height of the protrusion is preferably 5 μm to 100 μm, more preferably 10 μm to 30 μm.

In an exemplary embodiment of the present application, the pitch of the protrusion means the distance between first inclined surfaces of adjacent protrusions with respect to the first surface, and the pitch of the protrusion can be 5 μm to 30 μm, and can be 10 μm to 100 μm. When the pitch of the protrusion is out of the above-described range, a Moiré phenomenon with the panel can occur, which is not desirable.

The height of the protrusion and the pitch of the protrusion are schematically illustrated in the following FIG. 6.

In an exemplary embodiment of the present application, the aspect ratio of each of the protrusions represented by Equation 1 can be more than 1.5 and less than 3.0, and can be 1.6 to 2.0. By satisfying the aspect ratio of the protrusion as described above, the contrast ratio of the viewing angle compensation film can be improved, and the viewing angle can be improved.

In an exemplary embodiment of the present application, the highest point or lowest point of each of the protrusions can have a radius of curvature (R) of 1 μm or less and a radius of curvature (R) of 0.5 μm to 1 μm. By satisfying the radius of curvature of the highest point or lowest point of the protrusion as described above, the contrast ratio of the viewing angle compensation film can be improved, and the viewing angle can be enhanced.

In an exemplary embodiment of the present application, the highest point of each of the protrusions has a radius of curvature (R) of 1 μm or less, and a flat surface can be provided between the protrusions adjacent to each other. In this case, the length of the flat surface provided between the protrusions adjacent to each other can be 3 μm or less, and can be more than 0 and 1.5 μm or less. When the length of the flat surface provided between the protrusions adjacent to each other is out of the above-described numerical range, the front luminance can not be affected, but the enhancement width of the contrast ratio of Area A can be reduced.

In an exemplary embodiment of the present application, a plurality of protrusions comprised in the second surface can be continuously arranged. When the plurality of protrusions are continuously provided, a pattern layer can be formed such that the first inclined surface of one protrusion and the second inclined surface of the other protrusion are brought into contact with each other.

According to another exemplary embodiment, the plurality of protrusions can be provided so as not to be continuous.

In an exemplary embodiment of the present application, at least one cross section perpendicular to the first surface of the protrusion can be in the form of a triangle, quadrangle or pentagon. However, the highest point or lowest point in the form of the triangle, quadrangle or pentagon has a radius of curvature (R) of 1 μm or less.

When at least one cross section perpendicular to the first surface of the protrusion is in the form of a triangle, one end of the first inclined surface and the other end are formed such that the one end is brought into contact with one end of the second inclined surface and the other end is brought into contact with the first surface, and an end of the second inclined surface which is not brought into contact with the end of the first inclined surface can be formed so as to be brought into contact with the first surface.

The case where at least one cross section perpendicular to the first surface of the protrusion is in the form of a quadrangle comprises a third inclined surface formed such that one end of the first inclined surface and one end of the second inclined surface are brought into contact with the first surface and are brought into contact with the other end of the first inclined surface and the other end of the second inclined surface, or comprises a third inclined surface formed such that one end of the first inclined surface is brought into contact with the first surface and the other end is brought into one end of the second inclined surface, and formed such that one end of the second inclined surface, which is not brought into contact with one end of the first inclined surface, is brought into contact with the first surface.

When at least one cross section perpendicular to the first surface of the protrusion is in the form of a pentagon, a plurality of protrusions are continuously formed, and formed such that the protrusion consists of a first inclined surface and a second inclined surface, and one end of the first inclined surface of one protrusion is brought into contact with one end of the second inclined surface of an adjacent protrusion, but is not brought into contact with the first surface.

In an exemplary embodiment of the present application, an angle ($\theta$) between the first inclined surface or a surface extending from the first inclined surface and the second inclined surface or a surface extending from the second inclined surface can be 20° to 60°, 30° to 50°, and 40° to 50°. When the angle ($\theta$) between the first inclined surface or a surface extending from the first inclined surface and the second inclined surface or a surface extending from the second inclined surface satisfies the above range, it is possible to obtain effects of regulating the viewing angle of a display device and improving the contrast ratio by adjusting the refraction angle such that the light incident on the viewing angle compensation film forms a concentrated light form.

In an exemplary embodiment of the present application, the angle ($\theta_1$) between the first inclined surface or a surface extending from the first inclined surface and the first surface and the angle ($\theta_2$) between the second inclined surface or a surface extending from the second inclined surface and the first surface are the same as each other. As $\theta_1$ and $\theta_2$ have the same value, the viewing angle and the contrast ratio are improved by adjusting the refraction angle of the light incident on the pattern layer. In this case, $\theta_1$ and $\theta_2$ can be 60° to 80°, or 70° to 80°.

In an exemplary embodiment of the present application, the planarization layer is provided on the second surface side of the pattern layer.

In another exemplary embodiment, the planarization layer is provided so as to be brought into contact with the second surface of the pattern layer.

The difference in refractive index between the pattern layer and the planarization layer can be 0.02 to 0.4, preferably 0.03 to 0.2. In this case, the refractive index of the layer having a higher refractive index between the pattern layer and the planarization layer can be about 1.45 to 1.7, and the refractive index of the layer having a lower refractive index between the pattern layer and the planarization layer can be 1.3 to 1.55. The refractive index is measured at a wavelength of 590 nm.

A material for the pattern layer can be an ultraviolet curable resin, but the present invention is not limited thereto. An example of the ultraviolet curable resin can comprise epoxy(meth)acrylate, urethane(meth)acrylate, phenylphenol ethoxylated(meth)acrylate, trimethylolpropane ethoxylated (meth) acrylate, phenoxy benzyl (meth)acrylate, phenylphenoxyethyl (meth)acrylate, ethoxylated thiodiphenyl di(meth)acrylate, phenylthioethyl(meth)acrylate monomers or oligomers thereof, or fluorene derivative unsaturated resins, but is not limited thereto.

A material for the planarization layer can be formed using an ultraviolet curable resin or an acrylate-based bonding agent.

The planarization layer can have a thickness of about 1 μm to 200 μm.

The refraction angle of light passing through the pattern layer of the viewing angle compensation film can be 1° to 20°. In still another exemplary embodiment, the refraction angle can be 3° to 15°.

In an exemplary embodiment of the present application, the base film can be polyester, polyacryl, polyvinyl chloride, polycarbonate, polymethylmethacrylate, polystyrene, polyestersulfone, polybutadiene, a triacetate cellulose (TAC) film, a cycloolefin polymer (COP), polyethylene terephthalate (PET), an acrylic film, and the like, but is not limited thereto.

The acrylic film can comprise a (meth)acrylate-based resin, and a film comprising a (meth)acrylate-based resin can be obtained by molding a molding material containing a (meth)acrylate-based resin as a main ingredient by extrusion molding.

The acrylic film can be a film comprising a copolymer comprising an alkyl(meth)acrylate-based unit and a styrene-based unit, and an aromatic resin having a carbonate portion in the main chain, or a film comprising an alkyl(meth) acrylate-based unit, a styrene-based unit, a 3- to 6-membered heterocyclic unit substituted with at least one carbonyl group, and a vinyl cyanide unit. Further, the acrylic film can be an acrylic resin having a lactone structure.

Examples of the (meth)acrylate-based resin having an aromatic ring comprise a resin composition comprising: (a) a (meth)acrylate-based unit comprising one or more (meth) acrylate-based derivatives; (b) an aromatic unit having a chain with a hydroxy group-containing portion and an aromatic portion; and (c) a styrene-based unit comprising one or more styrene-based derivatives. The units of (a) to (c) can also be each comprised in the form of a separate copolymer in the resin composition, and two or more units among the units of (a) to (c) can also be comprised in the form of one copolymer in the resin composition.

The method of preparing the (meth)acrylate-based resin film is not particularly limited, and for example, the (meth) acrylate-based resin film can be prepared by sufficiently mixing a (meth)acrylate-based resin, other polymers, additives, and the like by any appropriate mixing method to prepare a thermoplastic resin composition, and then film-molding the thermoplastic resin composition, or by preparing a (meth)acrylate-based resin, other polymers, additives, and the like as a separate solution, mixing the mixture to form a uniform mixture solution, and then film-molding the mixture.

The thermoplastic resin composition is, for example, prepared by pre-blending the film raw material by using any appropriate mixer such as an omni-mixer, and then extrusion-kneading the obtained mixture. In this case, the mixer used in extrusion-kneading is not particularly limited, and it is possible to use any appropriate mixer such as, for example, an extruder such as a single-screw extruder and a twin-screw extruder or a pressure kneader.

Examples of the film-molding method comprise any appropriate film molding method such as a solution cast method (solution casting method), a melt extrusion method, a calendar method, and a compression molding method, and are not limited thereto, but the solution cast method (solution casting method) and melt extrusion method are preferred.

Examples of solvents used in the solution cast method (solution casting method) comprise: aromatic hydrocarbons such as benzene, toluene, and xylene; aliphatic hydrocarbons such as cyclohexane and decaline; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide, and the like, and these solvents can be used either alone or in combination of two or more thereof.

Examples of an apparatus for performing the solution cast method (solution casting method) comprise a drum-type casting machine, a band-type casting machine, a spin coater and the like. Examples of the melt extrusion method comprise a T-die method, an inflation method, and the like. The molding temperature is specifically 150° C. to 350° C., more specifically 200° C. to 300° C., but is not limited thereto.

When a film is molded by the T-die method, a T-die is mounted on a front end portion of a publicly-known single- or twin-screw extruder, and a film extruded in a film form is wound, thereby obtaining a roll-shaped film. In this case, the film can also be uniaxially stretched by appropriately adjusting the temperature of a winding roll to stretch the film in an extrusion direction. Further, simultaneous biaxial stretching, successive biaxial stretching, and the like can also be performed by stretching the film in a direction perpendicular to an extrusion direction.

The acrylic film can be any one of an unstretched film or a stretched film. The acrylic film can be a uniaxially stretched film or a biaxially stretched film when the acrylic film is a stretched film, and the acrylic film can be a simultaneously biaxially stretched film or a successively biaxially stretched film when the acrylic film is the biaxially stretched film. When the acrylic film is biaxially stretched, mechanical strength of the film is improved, so that performance of the film is improved. The acrylic film is mixed with other thermoplastic resins, so that the acrylic film can suppress an increase in phase difference and maintain optical isotropy even when the acrylic film is stretched.

The stretching temperature is preferably within a range near a glass transition temperature of a thermoplastic resin composition as the film raw material, preferably within (a glass transition temperature−30° C.) to (a glass transition temperature+100° C.), and more preferably within (a glass transition temperature−20° C.) to (a glass transition temperature+80° C.). There is a concern in that when the stretching temperature is less than (the glass transition temperature−30° C.), a sufficient stretching magnification ratio can not be obtained. In contrast, when the stretching temperature is more than (the glass transition temperature+

100° C.), there is a concern in that the flow of the resin composition occurs, and thus, stable stretching can not be performed.

A stretching magnification ratio defined as an area ratio is preferably 1.1 times to 25 times and more preferably 1.3 times to 10 times. There is a concern in that a stretching magnification ratio of less than 1.1 times can not lead to an improvement in toughness, which is accompanied by stretching. When the stretching magnification ratio is more than 25 times, there is a concern in that effects obtained by increasing the stretching magnification ratio are not acknowledged.

The stretching speed is preferably 10%/min to 20,000%/min, and more preferably 100%/min to 10,000%/min in one direction. When the stretching speed is less than 10%/min, it takes a rather long time to obtain a sufficient stretching magnification ratio, so that there is a concern in that the manufacturing costs can be increased. When the stretching speed is more than 20,000%/min, there is a concern in that fracture of the stretched film and the like can be incurred.

In order to stabilize optical isotropy and mechanical properties of an acrylic film, the acrylic film can be subjected to a heat treatment (annealing) and the like after the stretching treatment. Conditions for the heat treatment are not particularly limited, and any appropriate conditions known in the art can be adopted.

In an exemplary embodiment of the present application, an optical layer can be further comprised on a surface opposite to the surface of the base film provided with the viewing angle compensation film. The optical layer can comprise one or more of an anti-glare (AG) layer, a hard coating (HC) layer, a low refractive index (LR) layer, an anti-glare and low-reflection (AGLR) layer, an antireflection (AR) layer, and the like, and is not limited thereto. In this case, by using a coating composition for forming the layers, it is possible to perform a method of applying the coating composition on a base film and drying the coating composition using a method well-known in the art, for example, a bar coating method, a gravure coating method, a slot die coating method, and the like. In this case, although the drying process is performed through a convection oven and the like, the drying process is not limited thereto, and is performed preferably at a temperature of 100° C. to 120° C. for 1 minute to 5 minutes. The drying temperature varies according to steps of coating the composition, and in case of a stretching-completed film, the drying process can be performed in a range in which the drying temperature does not exceed a glass transition temperature (Tg) of the film, and in the case of comprising the stretching process, the drying process is performed at a stretching temperature at the same time as the stretching process, and the drying process is performed in a range in which the drying temperature does not exceed a decomposition temperature (Td) of the film.

The hard coating layer, the anti-glare (AG) layer, the low refractive index layer (LR), the anti-glare and low-reflection (AGLR) layer, and the antireflection (AR) layer can be formed of a material for a primer layer generally used, and each of the hard coating layer, the anti-glare (AG) layer, the low refractive index (LR) layer, the anti-glare and low-reflection (AGLR) layer, and the antireflection (AR) layer can have a thickness of 1 μm to 100 μm.

In an exemplary embodiment of the present application, the polarizer and the bonding agent layer can be provided in direct contact with each other.

In an exemplary embodiment of the present application, a polarizer protective film can be further comprised between the polarizer and the adhesive agent layer. The polarizer protective film can be a triacetate cellulose (TAC) film, a cycloolefin polymer (COP), an acrylic film, and the like, and is not limited thereto.

In an exemplary embodiment of the present application, the polarizer is not particularly limited, and a polarizer well-known in the art, for example, a film composed of polyvinyl alcohol (PVA) comprising iodine or a dichroic dye can be used.

The polarizer exhibits a characteristic capable of extracting only light oscillating in one direction from light incident while oscillating in various directions. These characteristics can be achieved by stretching an iodine-absorbed polyvinyl alcohol (PVA) under high tension. For example, more specifically, a polarizer can be formed by a step of swelling a PVA film by immersing the PVA film in an aqueous solution, a step of dyeing the swollen PVA film with a dichroic substance imparting a polarization property to the swollen PVA film, a stretching step of arranging the dichroic dye substance in parallel with the stretching direction by stretching the dyed PVA film, and a color correcting step of correcting the color of the PVA film subjected to the stretching step. However, the polarizing plate of the present application is not limited thereto.

In an exemplary embodiment of the present application, the adhesive agent layer or bonding agent layer can comprise an adhesive agent or a bonding agent generally used, and the adhesive agent layer or bonding agent layer can have a thickness of 1 μm to 200 μm and 1 μm to 100 μm, but the thickness is not limited thereto.

Figures 1, 2:
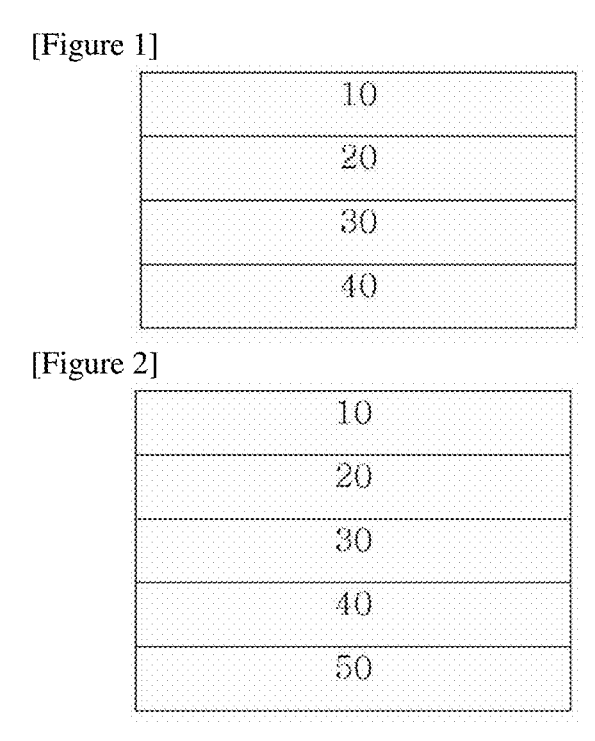

A polarizing plate laminate according to an exemplary embodiment of the present application is schematically illustrated in the following FIGS. 1 and 2. As illustrated in the following FIG. 1, the polarizing plate laminate according to an exemplary embodiment of the present application comprises: a polarizer 10; an adhesive agent layer or bonding agent layer 20 provided on the polarizer 10; a viewing angle compensation film 30 provided on the adhesive agent layer or bonding agent layer 20; and a base film 40 provided on the viewing angle compensation film 30. Further, as illustrated in the following FIG. 2, the polarizing plate laminate according to an exemplary embodiment of the present application can further comprise an optical layer 50 on a surface opposite to a surface of the base film 40 provided with the viewing angle compensation film 30.

In addition, a pattern layer comprised in the viewing angle compensation film according to an exemplary embodiment of the present application is schematically illustrated in the following FIGS. 4 and 8. The following FIG. 4 illustrates a pattern layer in which the aspect ratio of each of the protrusions is more than 1.5 and less than 3.0, and the highest point or lowest point of each of the protrusions has a radius of curvature (R) of 1 μm or less. Furthermore, the following FIG. 8 illustrates a pattern layer in which the aspect ratio of each of the protrusions is more than 1.5 and less than 3.0, and a flat surface is provided between the protrusions adjacent to each other.

Further, another exemplary embodiment of the present application provides a display device comprising: a liquid crystal cell; a first polarizing plate provided at a viewing side of the liquid crystal cell; a second polarizing plate provided at a side opposite to the viewing side of the liquid crystal cell; and a backlight unit provided at a side opposite to a surface of the second polarizing plate facing the liquid crystal cell, in which the first polarizing plate or the second polarizing plate is the polarizing plate laminate.

In addition, in an exemplary embodiment of the present application, the second polarizing plate can be the polarizing plate laminate. When the first polarizing plate provided at the viewing side of the liquid crystal cell is the polarizing plate laminate, a rainbow phenomenon occurs due to reflection by external light, which is not desirable. More specifically, the case where the first polarizing plate provided at the viewing side of the liquid crystal cell is the polarizing plate laminate can be represented by a structure of a viewing angle compensation film/a polarizing plate/glass on a panel. In the structure described above, light scattering, that is, a rainbow phenomenon, can occur while the light emitted by the external light transmitted and reflected on the glass on the panel is passing through the viewing angle compensation film.

In an exemplary embodiment of the present application, the display device can be manufactured using materials and methods known in the art, except that the first polarizing plate or the second polarizing plate is the polarizing plate laminate.

In an exemplary embodiment of the present application, the second surface of the pattern layer can be disposed close to the liquid crystal cell.

In an exemplary embodiment of the present application, the display device can be a display device for a vehicle.

Figure 12:
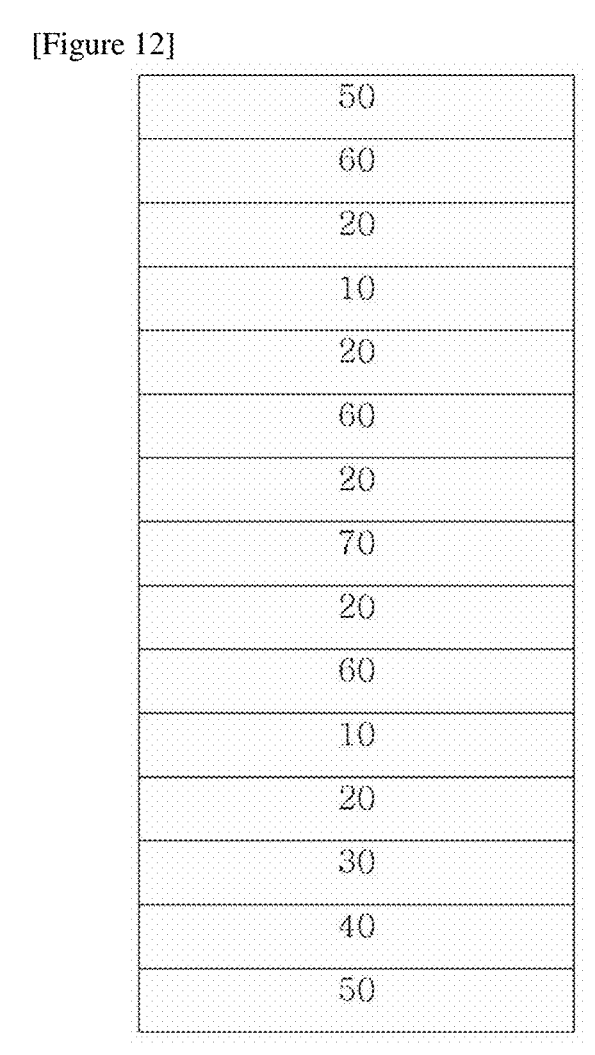

A display device comprising the polarizing plate laminate according to an exemplary embodiment of the present application is schematically illustrated in the following FIGS. 9 to 12. As illustrated in the following FIGS. 9 to 12, the display device comprising the polarizing plate laminate according to an exemplary embodiment of the present application can be manufactured with various structures. More specifically, in the display device according to the following FIGS. 9 to 12, it was shown that the second polarizing plate provided at the side opposite to the viewing side of the liquid crystal cell is the polarizing plate laminate of the present application. Furthermore, the polarizing plate laminates of the following FIGS. 9 and 10 are shown to have a structure further comprising a polarizer protective film between a polarizer and an adhesive agent layer, and the polarizing plate laminates of the following FIGS. 11 and 12 are shown to have a structure in which a polarizer and a bonding agent layer are provided in direct contact with each other.

According to an exemplary embodiment of the present application, as the main viewing angle (maximum brightness angle) of the display device changes and the light concentrating ratio increases, the contrast ratio (C/R) at a position which is not parallel to the display device can be improved.

The backlight unit comprises a light source which emits light from the rear surface of a liquid crystal panel, and the type of light source is not particularly limited, and a general light source for LCD, such as CCFL, HCFL, or LED can be used.

MODE FOR INVENTION

Hereinafter, exemplary embodiments described in the present specification will be exemplified through Examples. However, the scope of the exemplary embodiments is not intended to be limited by the following Examples.

Experimental Example 1

Preparation Example 1-1

Viewing Angle Compensation Film with Aspect Ratio of 1.87 and Radius of Curvature of Highest Point of 0.5 μm As illustrated in the following FIG. 3, a viewing angle compensation film, in which a base film 40, a pattern layer 90, and a planarization layer 100 were laminated in this order, was constructed 1) Pattern layer: the angle ($\theta$) between the first inclined surface and the second inclined surface is 30°, the angle ($\theta_1$) between the first inclined surface and the first surface is 75°, and the angle ($\theta_2$) between the second inclined surface and the first surface is 75° (refractive index at a wavelength of 590 nm: 1.45)

The height of the protrusion of the pattern layer is 28 μm, the pitch of the protrusion is 15 μm, and the aspect ratio of the protrusion is 1.87.

The highest point of each protrusion of the pattern layer has a radius of curvature (R) of 0.5 μm.

2) Planarization layer: Provided over the pattern layer (refractive index at a wavelength of 590 nm: 1.58)

Preparation Example 1-2

Viewing Angle Compensation Film with Aspect Ratio of 1.87 and Radius of Curvature of Highest Point of 1 μm A viewing angle compensation film was constructed in the same manner as in Preparation Example 1-1, except that the radius of curvature (R) of the highest point of each of the protrusions of the pattern layer was set at 1 μm.

Preparation Example 1-3

Viewing Angle Compensation Film with Aspect Ratio of 1.87 and Radius of Curvature of Lowest Point of 0.5 μm A viewing angle compensation film was constructed in the same manner as in Preparation Example 1-1, except that the radius of curvature (R) of the lowest point of each of the protrusions of the pattern layer was set at 0.5 μm.

Preparation Example 1-4

Viewing Angle Compensation Film with Aspect Ratio of 1.87 and Radius of Curvature of Lowest Point of 1 μm A viewing angle compensation film was constructed in the same manner as in Preparation Example 1-1, except that the radius of curvature (R) of the lowest point of each of the protrusions of the pattern layer was set at 1 μm.

Preparation Example 1-5

Viewing Angle Compensation Film with Aspect Ratio of 1.87, Radius of Curvature of Highest Point of 0.5 μm, and Difference in Refractive Index of 0.09

A viewing angle compensation film was constructed in the same manner as in Preparation Example 1-1, except that the difference in refractive index between the pattern layer and the planarization layer was adjusted to 0.09.

(Pattern Layer Refractive Index 1.52/Planarization Layer Refractive Index 1.61)

Preparation Example 1-6

Viewing Angle Compensation Film with Aspect Ratio of 1.87, Radius of Curvature of Highest Point of 0.5 μm, and Difference in Refractive Index of 0.11

A viewing angle compensation film was constructed in the same manner as in Preparation Example 1-1, except that the difference in refractive index between the pattern layer and the planarization layer was adjusted to 0.11.

(Pattern Layer Refractive Index 1.50/Planarization Layer Refractive Index 1.61)

Preparation Example 1-7

Viewing Angle Compensation Film with Aspect Ratio of 1.87, Radius of Curvature of Highest Point of 0.5 μm, and Difference in Refractive Index of 0.15

A viewing angle compensation film was constructed in the same manner as in Preparation Example 1-1, except that the difference in refractive index between the pattern layer and the planarization layer was adjusted to 0.15.

(Pattern Layer Refractive Index 1.46/Planarization Layer Refractive Index 1.61)

Preparation Example 1-8

Viewing Angle Compensation Film with Aspect Ratio of 1.87, Radius of Curvature of Highest Point of 0.5 μm, and Difference in Refractive Index of 0.17

A viewing angle compensation film was constructed in the same manner as in Preparation Example 1-1, except that the difference in refractive index between the pattern layer and the planarization layer was adjusted to 0.17.

(Pattern Layer Refractive Index 1.44/Planarization Layer Refractive Index 1.61)

Preparation Example 1-9

Viewing Angle Compensation Film with Aspect Ratio of 1.87, Radius of Curvature of Highest Point of 0.5 μm, and Difference in Refractive Index of 0.18

A viewing angle compensation film was constructed in the same manner as in Preparation Example 1-1, except that the difference in refractive index between the pattern layer and the planarization layer was adjusted to 0.18.

(Pattern Layer Refractive Index 1.43/Planarization Layer Refractive Index 1.61)

Preparation Example 1-10

Viewing Angle Compensation Film with Aspect Ratio of 1.87, Radius of Curvature of Highest Point of 0.5 μm, and Flat Surface Length of 1 μm A viewing angle compensation film was constructed in the same manner as in Preparation Example 1-1, except that a flat surface having a length of 1 μm was introduced between the protrusions adjacent to each other in the pattern layer.

Preparation Example 1-11

Viewing Angle Compensation Film with Aspect Ratio of 1.87, Radius of Curvature of Highest Point of 0.5 μm, and Flat Surface Length of 1 μm A viewing angle compensation film was constructed in the same manner as in Preparation Example 1-10, except that the difference in refractive index between the pattern layer and the planarization layer was adjusted to 0.11.

(Pattern Layer Refractive Index 1.50/Planarization Layer Refractive Index 1.61)

Comparative Preparation Example 1-1

Viewing Angle Compensation Film with Aspect Ratio of 1.87 and No Radius of Curvature A viewing angle compensation film was constructed in the same manner as in Preparation Example 1-1, except that the radius of curvature was not applied to the highest point of each of the protrusions of the pattern layer.

Comparative Preparation Example 1-2

Viewing Angle Compensation Film with Aspect Ratio of 1.07 and Radius of Curvature of Highest Point of 0.5 μm A viewing angle compensation film was constructed in the same manner as in Preparation Example 1-1, except that the aspect ratio of the protrusion was adjusted to 1.07 by constructing the pattern layer as described below.

1) Pattern layer: the angle (θ) between the first inclined surface and the second inclined surface is 50°, the angle ($θ_1$) between the first inclined surface and the first surface is 65°, and the angle ($θ_2$) between the second inclined surface and the first surface is 65° (refractive index at a wavelength of 590 nm: 1.58)

The height of the protrusion of the pattern layer is 16.1 μm, the pitch of the protrusion is 15 μm, and the aspect ratio of the protrusion is 1.07.

Comparative Preparation Example 1-3

Viewing Angle Compensation Film with Aspect Ratio of 1.37 and Radius of Curvature of Highest Point of 0.5 μm A viewing angle compensation film was constructed in the same manner as in Preparation Example 1-1, except that the aspect ratio of the protrusion was adjusted to 1.37 by constituting the pattern layer as described below.

1) Pattern layer: the angle (θ) between the first inclined surface and the second inclined surface is 40°, the angle ($θ_1$) between the first inclined surface and the first surface is 70°, and the angle ($θ_2$) between the second inclined surface and the first surface is 70° (refractive index at a wavelength of 590 nm: 1.58)

The height of the protrusion of the pattern layer is 20.6 μm, the pitch of the protrusion is 15 μm, and the aspect ratio of the protrusion is 1.37.

Example 1-1

Simulations were performed by constructing the display devices comprising the viewing angle compensation films in the Preparation Examples and the Comparative Preparation Examples.

A polarizing plate was manufactured by laminating the viewing angle compensation film on a polarizer prepared in advance. Specifically, a polarizing plate laminate was constructed by applying an adhesive agent to a second surface side of the pattern layer of the viewing angle compensation film of Preparation Example 1-1 and laminating the viewing angle compensation film on one surface of the polarizer through the application.

A display device was constructed by disposing the polarizing plate laminate as a second polarizing plate provided at a side opposite to the viewing side of the liquid crystal cell.

The contrast ratio (C/R) distribution of the display device was measured, and the results thereof are shown in the following Table 1. The CR value was calculated by using EZContrast x188 equipment from Eldim to measure the viewing angle distribution in the on/off state (White/Black mode) of the panel.

A liquid crystal display (LCD) device has been used in various devices such as TVs, monitors, mobile phones, and tablet PCs. The liquid crystal display device expresses the performance thereof by using a value called a contrast ratio (CR) which indicates a ratio of white front luminance (On state) to black front luminance (Off state) as one numerical value exhibiting the performance, and the higher the CR is, the better the device is evaluated.

However, the liquid crystal display device began to be applied to a field in which the liquid crystal display device had not been conventionally applied for the development of technology and the human convenience, and an automotive liquid crystal display device such as an automotive dashboard and a navigator has been introduced. In the case of the automotive liquid crystal display device, the screen is viewed from the side rather than from the front in most cases as in the existing liquid crystal display device (TV, a mobile phone, and the like). Accordingly, in the present application, a numerical value called Area A CR for quantifying the performance of a liquid crystal display device at the viewing angle other than the front CR for indicating the performance of the liquid crystal display device was introduced. In the present application, Area A CR was set to indicate the CR at a viewing angle of 40 degrees.

Examples 1-2 to 1-9

Examples 1-2 to 1-9 were performed in the same manner as in Example 1-1, except that the viewing angle compensation films of Preparation Examples 1-2 to 1-9 were applied instead of the viewing angle compensation film of Preparation Example 1-1.

Comparative Example 1-1

A display device to which a viewing angle compensation film was not applied was constructed as a reference.

Comparative Examples 1-2 to 1-4

Comparative Examples 1-1 to 1-3 were performed in the same manner as in Example 1, except that the viewing angle compensation films of Comparative Preparation Examples 1-1 to 1-3 were applied instead of the viewing angle compensation film of Preparation Example Comparative Example 1-5

Comparative Example 1-5 was performed in the same manner as in Example 1-1, except that the polarizing plate laminate was disposed as a first polarizing plate provided at the viewing side of the liquid crystal cell instead of disposing the polarizing plate laminate as a second polarizing plate provided at a side opposite to the viewing side of the liquid crystal cell.

TABLE 1

| | Viewing angle Compensation film | Front brightness (%) | Area A Luminance distribution (%) |
|---|---|---|---|
| Comparative Example 1-1 | — | 100 | 100 |
| Comparative Example 1-2 | Comparative Preparation Example 1-1 | 82 | 124 to 129 |
| Example 1-1 | Preparation Example 1-1 | 82 | 134 to 136 |
| Example 1-2 | Preparation Example 1-2 | 78 | 133 to 136 |
| Example 1-3 | Preparation Example 1-3 | 80 | 125 to 127 |
| Example 1-4 | Preparation Example 1-4 | 81 | 122 to 124 |

As shown in the results in Table 1, it can be confirmed that in the case of applying a viewing angle compensation film in which the radius of curvature (R) of the highest point of each of protrusions was set to 0.5 μm or 1 μm at a difference in refractive index of 0.13, there was no big difference in front brightness, but Area A luminance was increased.

TABLE 2

| | Viewing angle Compensation film | Front brightness (%) | Area A Luminance distribution (%) |
|---|---|---|---|
| Comparative Example 1-1 | — | 100 | 100 |
| Comparative Example 1-3 | Comparative Preparation Example 1-2 | 66 | 124 to 126 |
| Comparative Example 1-4 | Comparative Preparation Example 1-3 | 36 | 127 to 130 |
| Example 1-1 | Preparation Example 1-1 | 82 | 134 to 136 |

As shown in the results in Table 2, it can be confirmed that in the case of applying a viewing angle compensation film in which an aspect ratio of the protrusion was more than 1.5 and less than 3.0, the front brightness and Area A luminance were increased.

TABLE 3

| | Viewing angle Compensation film | Front brightness (%) | Area A Luminance distribution (%) |
|---|---|---|---|
| Comparative Example 1-1 | — | 100 | 100 |
| Example 1-1 | Preparation Example 1-1 | 82 | 134 to 136 |
| Example 1-5 | Preparation Example 1-5 | 74 | 118 to 123 |
| Example 1-6 | Preparation Example 1-6 | 78 | 123 to 126 |
| Example 1-7 | Preparation Example 1-7 | 84 | 125 to 130 |
| Example 1-8 | Preparation Example 1-8 | 89 | 126 to 130 |
| Example 1-9 | Preparation Example 1-9 | 89 | 125 to 130 |

As shown in the results in Table 3, it can be confirmed that when the viewing angle compensation film according to an exemplary embodiment of the present application was applied, the front brightness can be slightly decreased, but Area A luminance was increased by 20% to 30%, as compared to the case where the viewing angle compensation film was not applied.

TABLE 4

| | Viewing angle compensation film | Front brightness (%) | Area A luminance distribution (%) |
|---|---|---|---|
| Comparative Example 1-1 | — | 100 | 100 |
| Example 1-10 | Preparation Example 10 | 95 | 119 |
| Example 1-11 | Preparation Example 11 | 91 | 113 |

As shown in the results in Table 4, it can be confirmed that in the case of applying a viewing angle compensation film in which the highest point of each of protrusions had a radius of curvature (R) of 1 μm or less and a flat surface was provided between protrusions adjacent to each other, the front brightness could be slightly decreased, but Area A luminance was increased.

Further, as an exemplary embodiment of the present application, the black states of the display devices of Example 1-1, Comparative Example 1-1, and Comparative Example 1-5 are illustrated in the following FIG. 5. As shown in the results in the following FIG. 5, it can be confirmed that when the first polarizing plate provided at the viewing side of the liquid crystal cell was the polarizing plate laminate, a rainbow phenomenon occurred due to reflection by external light.

As shown in the results, the polarizing plate laminate according to an exemplary embodiment of the present application is characterized by being able to improve the contrast ratio and enhance the viewing angle by comprising a viewing angle compensation film comprising protrusions with an aspect ratio of more than 1.5 and less than 3.0 and a radius of curvature (R) of the peak of 1 μm or less.

Experimental Example 2

Preparation Example 2-1

Viewing Angle Compensation Film with Aspect Ratio of 1.87 and Flat Surface Length of 0.5 μm As illustrated in the following FIG. 3, a viewing angle compensation film, in which a base film 40, a pattern layer 90, and a planarization layer 100 were laminated in this order, was constructed.

1) Pattern layer: the angle (θ) between the first inclined surface and the second inclined surface is 30°, the angle ($\theta_1$) between the first inclined surface and the first surface is 75°, and the angle ($\theta_2$) between the second inclined surface and the first surface is 75° (refractive index at a wavelength of 590 nm: 1.43)

The height of the protrusion of the pattern layer is 28 μm, the pitch of the protrusion is 15 μm, and the aspect ratio of the protrusion is 1.87.

The length of the flat surface between protrusions adjacent to each other is 0.5 μm.

2) Planarization layer: Provided over the pattern layer (refractive index at a wavelength of 590 nm: 1.61)

Preparation Example 2-2

Viewing Angle Compensation Film with Aspect Ratio of 1.87 and Flat Surface Length of 1 μm A viewing angle compensation film was constructed in the same manner as in Preparation Example 2-1, except that the length of the flat surface between protrusions adjacent to each other in the pattern layer was adjusted to 1 μm.

Preparation Example 2-3

Viewing Angle Compensation Film with Aspect Ratio of 1.87 and Flat Surface Length of 1.5 μm A viewing angle compensation film was constructed in the same manner as in Preparation Example 2-1, except that the length of the flat surface between protrusions adjacent to each other in the pattern layer was adjusted to 1.5 μm.

Preparation Example 2-4

Viewing Angle Compensation Film with Aspect Ratio of 1.87 and Flat Surface Length of 2 μm A viewing angle compensation film was constructed in the same manner as in Preparation Example 2-1, except that the length of the flat surface between protrusions adjacent to each other in the pattern layer was adjusted to 2 μm.

Preparation Example 2-5

Viewing Angle Compensation Film with Aspect Ratio of 1.87 and Flat Surface Length of 2.5 μm A viewing angle compensation film was constructed in the same manner as in Preparation Example 2-1, except that the length of the flat surface between protrusions adjacent to each other in the pattern layer was adjusted to 2.5 μm.

Preparation Example 2-6

Viewing Angle Compensation Film with Aspect Ratio of 1.87 and Flat Surface Length of 3 μm A viewing angle compensation film was constructed in the same manner as in Preparation Example 2-1, except that the length of the flat surface between protrusions adjacent to each other in the pattern layer was adjusted to 3 μm.

Preparation Example 2-7

Viewing Angle Compensation Film with Aspect Ratio of 1.87 and Flat Surface Length of 3.5 μm A viewing angle compensation film was constructed in the same manner as in Preparation Example 2-1, except that the length of the flat surface between protrusions adjacent to each other in the pattern layer was adjusted to 3.5 μm.

Preparation Example 2-8

Viewing Angle Compensation Film with Aspect Ratio of 1.87, Flat Surface Length of 1 μm, and Difference in Refractive Index of 0.13

A viewing angle compensation film was constructed in the same manner as in Preparation Example 2-2, except that the difference in refractive index between the pattern layer and the planarization layer was adjusted to 0.13.

(Pattern Layer Refractive Index 1.45/Planarization Layer Refractive Index 1.58)

Preparation Example 2-9

Viewing Angle Compensation Film with Aspect Ratio of 1.87, Radius of Curvature of Highest Point of 0.5 μm, and Flat Surface Length of 1 μm A viewing angle compensation film was constructed in the same manner as in Preparation Example 2-2, except that a radius of curvature (R) of 0.5 μm was introduced into the highest point of each of the protrusions of the pattern layer.

Preparation Example 2-10

Viewing Angle Compensation Film with Aspect Ratio of 1.87, Radius of Curvature of Highest Point of 0.5 μm, and Flat Surface Length of 1 μm A viewing angle compensation film was constructed in the same manner as in Preparation Example 2-9, except that the difference in refractive index between the pattern layer and the planarization layer was adjusted to 0.11.

(Pattern Layer Refractive Index 1.50/Planarization Layer Refractive Index 1.61)

Comparative Preparation Example 2-1

Viewing Angle Compensation Film with Aspect Ratio of 1.07, Flat Surface Length of 1 μm, and Difference in Refractive Index of 0.13

A viewing angle compensation film was constructed in the same manner as in Preparation Example 2-8, except that the aspect ratio of the protrusion was adjusted to 1.07 by constituting the pattern layer as described below.

1) Pattern layer: the angle (θ) between the first inclined surface and the second inclined surface is 50°, the angle ($θ_1$) between the first inclined surface and the first surface is 65°, and the angle ($θ_2$) between the second inclined surface and the first surface is 65° (refractive index at a wavelength of 590 nm: 1.45)

The height of the protrusion of the pattern layer is 16.1 μm, the pitch of the protrusion is 15 μm, and the aspect ratio of the protrusion is 1.07.

Comparative Preparation Example 2-2

Viewing Angle Compensation Film with Aspect Ratio of 1.37, Flat Surface Length of 1 μm, and Difference in Refractive Index of 0.13

A simulation was performed by constructing a viewing angle compensation film in the same manner as in Preparation Example 2-8, except that the aspect ratio of the protrusion was adjusted to 1.37 by constructing the pattern layer as described above.

1) Pattern layer: the angle (θ) between the first inclined surface and the second inclined surface is 40°, the angle ($θ_1$) between the first inclined surface and the first surface is 70°, and the angle ($θ_2$) between the second inclined surface and the first surface is 70° (refractive index at a wavelength of 590 nm: 1.45)

The height of the protrusion of the pattern layer is 20.6 μm, the pitch of the protrusion is 15 μm, and the aspect ratio of the protrusion is 1.37.

Example 2-1

Simulations were performed by constructing the display devices comprising the viewing angle compensation films in the Preparation Examples and the Comparative Preparation Examples.

A polarizing plate was manufactured by laminating the viewing angle compensation film on a polarizer prepared in advance. Specifically, a polarizing plate laminate was constructed by applying an adhesive agent to a second surface side of the pattern layer of the viewing angle compensation film of Preparation Example 2-1 and laminating the viewing angle compensation film on one surface of the polarizer through the application.

A display device was constructed by disposing the polarizing plate laminate as a second polarizing plate provided at a side opposite to the viewing side of the liquid crystal cell.

The contrast ratio (C/R) distribution of the display device was measured, and the results thereof are shown in the following Table 5. The CR value was calculated by using EZContrast x188 equipment from Eldim to measure the viewing angle distribution in the on/off state (White/Black mode) of the panel.

Examples 2-2 to 2-10

Examples 2-2 to 2-10 were performed in the same manner as in Example 2-1, except that the viewing angle compensation films of Preparation Examples 2-2 to 2-10 were applied instead of the viewing angle compensation film of Preparation Example 2-1.

Comparative Example 2-1

A display device to which a viewing angle compensation film was not applied was constructed as a reference.

Comparative Examples 2-2 and 2-3

Comparative Examples 2-2 and 2-3 were performed in the same manner as in Example 2-1, except that the viewing angle compensation films of Comparative Preparation Examples 2-1 and 2-2 were applied instead of the viewing angle compensation film of Preparation Example 2-1.

TABLE 5

| | Viewing angle compensation film | Front brightness (%) | Area A luminance distribution (%) |
|---|---|---|---|
| Comparative Example 2-1 | — | 100 | 100 |
| Example 2-1 | Preparation Example 2-1 | 90 | 121 to 127 |
| Example 2-2 | Preparation Example 2-2 | 92 | 119 to 124 |
| Example 2-3 | Preparation Example 2-3 | 89 | 117 to 122 |
| Example 2-4 | Preparation Example 2-4 | 90 | 115 to 119 |
| Example 2-5 | Preparation Example 2-5 | 88 | 111 to 116 |
| Example 2-6 | Preparation Example 2-6 | 89 | 110 to 114 |
| Example 2-7 | Preparation Example 2-7 | 92 | 107 to 111 |

As shown in the results in Table 5, it can be confirmed that in the case of applying a viewing angle compensation film in which the aspect ratio of each of the protrusions was more than 1.5 and less than 3.0 at a difference in refractive index of 0.18 and a flat surface was provided between protrusions adjacent to each other, there was no big difference in front brightness, but Area A luminance was increased. Further, the case where the length of the flat surface provided between the protrusions adjacent to each other is 3 μm or less is more desirable in terms of the enhancement width of the contrast ratio of Area A.

TABLE 6

| | Viewing angle compensation film | Front brightness (%) | Area A luminance distribution (%) |
|---|---|---|---|
| Comparative Example 2-1 | — | 100 | 100 |
| Comparative Example 2-2 | Comparative Preparation Example 2-1 | 66 | 124 to 126 |
| Comparative Example 2-3 | Comparative Preparation Example 2-2 | 36 | 127 to 130 |
| Example 2-8 | Preparation Example 2-8 | 80 | 129 to 131 |

As shown in the results in Table 6, it can be confirmed that in the case of applying a viewing angle compensation film in which an aspect ratio of the protrusion is more than 1.5 and less than 3.0, the front brightness and Area A luminance were increased.

TABLE 7

| | Viewing angle compensation film | Front brightness (%) | Area A luminance distribution (%) |
|---|---|---|---|
| Comparative Example 2-1 | — | 100 | 100 |
| Example 2-9 | Preparation Example 2-9 | 95 | 119 |
| Example 2-10 | Preparation Example 2-10 | 91 | 113 |

As shown in the results in Table 7, it can be confirmed that in the case of applying a viewing angle compensation film in which the highest point of each of protrusions has a radius of curvature (R) and a flat surface is provided between protrusions adjacent to each other, the front brightness can be slightly decreased, but Area A luminance is increased.

As shown in the results, the polarizing plate laminate according to an exemplary embodiment of the present application can improve a contrast ratio and can enhance a viewing angle by comprising a viewing angle compensation film in which a flat surface is provided between protrusions adjacent to each other, the protrusions having an aspect ratio of more than 1.5 and less than 3.0.

As described above, a display device comprising the polarizing plate laminate according to an exemplary embodiment of the present application can obtain a clear image from the driver's visual field when used as a display device for a vehicle because it is possible to improve the contrast ratio and enhance the viewing angle.

The invention claimed is:

1. A polarizing plate laminate comprising:
a polarizer;
an adhesive agent layer or a bonding agent layer provided on the polarizer;
a viewing angle compensation film provided on the adhesive agent layer or the bonding agent layer; and
a base film provided on the viewing angle compensation film,
wherein the viewing angle compensation film comprises a pattern layer and a planarization layer and a difference in refractive index between the pattern layer and the planarization layer is 0.02 to 0.4,
wherein the pattern layer comprises: a first surface comprising a flat surface; and a second surface opposite to the first surface and comprising a plurality of protrusions,
wherein each of the protrusions comprises a first inclined surface and a second inclined surface,
wherein an angle ($\theta_1$) between the first inclined surface or a surface extending from the first inclined surface and the first surface and an angle ($\theta_2$) between the second inclined surface or a surface extending from the second inclined surface and the first surface are the same as each other,
wherein an angle ($\theta$) between the first inclined surface or the surface extending from the first inclined surface and the second inclined surface or the surface extending from the second inclined surface is 20° to 60°,
wherein an aspect ratio of each of the protrusions represented by Equation 1 is more than 1.5 and less than 3.0, and
wherein the highest point or the lowest point of each of the protrusions has a radius of curvature (R) of 0.5 μm to 1 μm:

$$\text{Aspect ratio of protrusion} = \text{Height of protrusion}/\text{Pitch of protrusion} \quad [\text{Equation 1}].$$

2. A polarizing plate laminate comprising:
a polarizer;
an adhesive agent layer or a bonding agent layer provided on the polarizer;
a viewing angle compensation film provided on the adhesive agent layer or the bonding agent layer; and
a base film provided on the viewing angle compensation film,
wherein the viewing angle compensation film comprises a pattern layer and a planarization layer and a difference in refractive index between the pattern layer and the planarization layer is 0.02 to 0.4,
wherein the pattern layer comprises: a first surface comprising a flat surface; and a second surface opposite to the first surface and comprising a plurality of protrusions,
wherein each of the protrusions comprises a first inclined surface and a second inclined surface,
wherein an angle ($\theta_1$) between the first inclined surface or a surface extending from the first inclined surface and the first surface and an angle ($\theta_2$) between the second inclined surface or a surface extending from the second inclined surface and the first surface are the same as each other,
wherein an angle ($\theta$) between the first inclined surface or the surface extending from the first inclined surface and the second inclined surface or the surface extending from the second inclined surface is 20° to 60°,
wherein the highest point of each of the protrusions has a radius of curvature (R) of 0.5 μm to 1 μm,
wherein an aspect ratio of each of the protrusions represented by Equation 1 is more than 1.5 and less than 3.0, and
wherein a flat surface is provided between the protrusions adjacent to each other:

$$\text{Aspect ratio of protrusion} = \text{Height of protrusion}/\text{Pitch of protrusion} \quad [\text{Equation 1}].$$

3. The polarizing plate laminate of claim 1, wherein the polarizer and the bonding agent layer are provided in direct contact with each other.

4. The polarizing plate laminate of claim 1, further comprising a polarizer protective film between the polarizer and the adhesive agent layer.

5. The polarizing plate laminate of claim 1, further comprising an optical layer on a surface of the base film opposite to a surface on which the viewing angle compensation film is disposed.

6. The polarizing plate laminate of claim 5, wherein the optical layer comprises one or more layers selected from the group consisting of an anti-glare (AG) layer, a hard coating (HC) layer, a low refractive index (LR) layer, an anti-glare and low-reflection (AGLR) layer and an antireflection (AR) layer.

7. The polarizing plate laminate of claim 1, wherein the protrusions have a height of 5 μm to 100 μm.

8. The polarizing plate laminate of claim 1, wherein the protrusions have a pitch of 5 μm to 30 μm.

9. The polarizing plate laminate of claim 1, wherein the highest point of each of the protrusions has a radius of curvature (R) of 0.5 μm to 1 μm, and a flat surface is provided between the protrusions adjacent to each other.

10. The polarizing plate laminate of claim 2, wherein the flat surface provided between the protrusions adjacent to each other has a length of 3 μm or less.

11. A display device comprising:
a liquid crystal cell;
a first polarizing plate provided at a viewing side of the liquid crystal cell;
a second polarizing plate provided at a side opposite to the viewing side of the liquid crystal cell; and
a backlight unit provided at a side opposite to a surface of the second polarizing plate facing the liquid crystal cell,
wherein the first polarizing plate or second polarizing plate is the polarizing plate laminate of claim 1.

12. The display device of claim 11, wherein the second polarizing plate is the polarizing plate laminate.

13. The display device of claim 11, wherein a second surface of the pattern layer is disposed close to the liquid crystal cell.

14. The display device of claim 11, wherein the display device is a display device for a vehicle.

\* \* \* \* \*